United States Patent Office

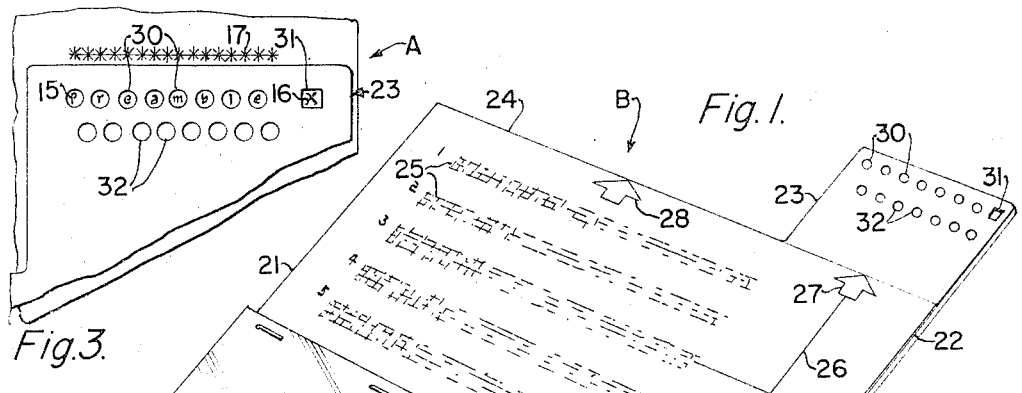
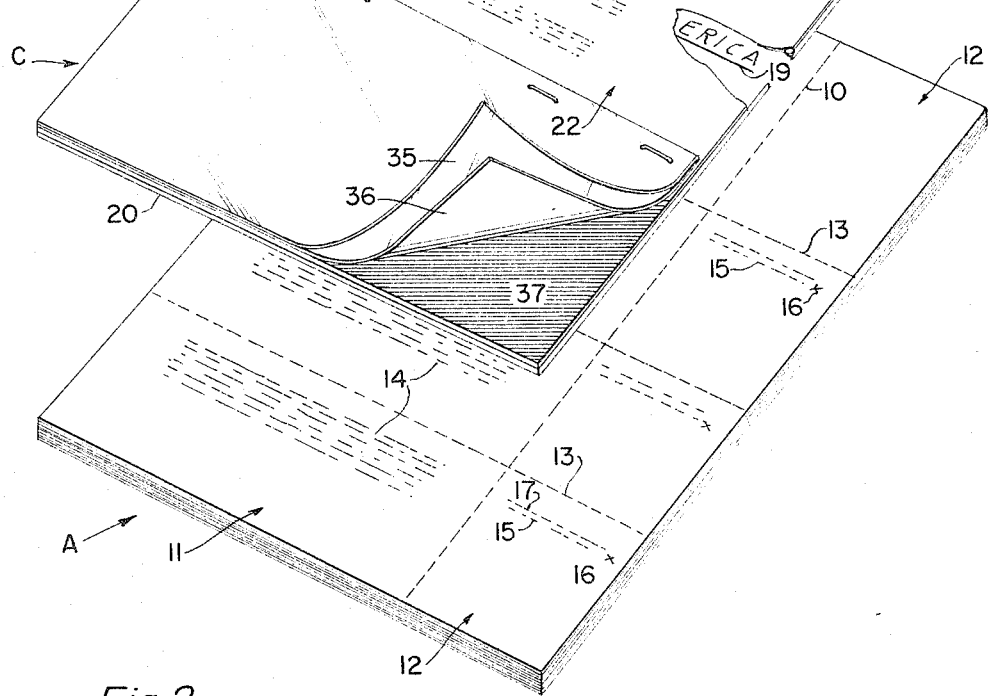
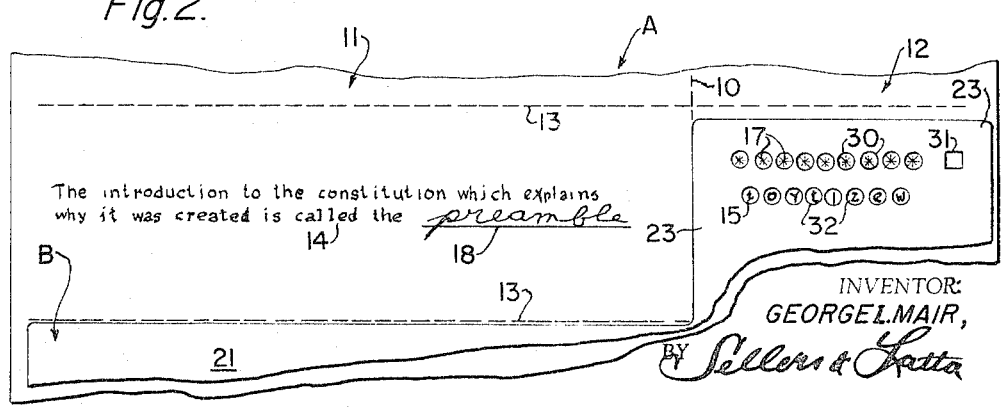

3,289,320
Patented Dec. 6, 1966

3,289,320
TEACHING APPARATUS HAVING UNCODING
TEMPLATE FOR CODED ANSWERS
George L. Mair, 6320 Van Nuys Blvd.,
Van Nuys, Calif.
Filed June 23, 1964, Ser. No. 377,242
5 Claims. (Cl. 35—9)

This invention relates to teaching apparatus of the type providing for presentation to a pupil of a series of questions followed by corresponding answers, currently referred to as a "teaching machine." The general object of the present invention is to provide an apparatus of this general class which is of relatively simple and inexpensive construction, adaptable for volume production and use. Toward the attainment of this general object, the invention aims to provide a teaching apparatus:

(1) Comprising a series of pages containing questions and answers in separate columns, together with a template which can be manipulated to disclose the questions and then the answers in alternating succession;

(2) Wherein the question and answer bearing pages may be in the form of a book or a binder which can be carried by a student as readily as a common note book;

(3) Wherein the questions are fully legible when not covered by the template, whereas the answers are coded so as to be illegible except when properly exposed through sight openings in the template;

(4) Wherein the sight openings of the template are arranged to register respectively with separate letters in each coded answer;

(5) Wherein the sight openings are embodied in an answer-uncoding portion of the template which projects above a horizontal top margin of the body portion of the template above which the questions are revealed, whereby each answer may be horizontally aligned with its corresponding question;

(6) Having an arrangement of answer-spelling letters and intervening coding characters rendering the answer unintelligible except when properly viewed through the template, and wherein the answer-spelling letters are spaced sufficiently adjacent one another to render the answer easily recognizable when viewed through the template;

(7) Having cooperating indicator means in the answer frames and in the template for notifying a reader when the template is in the proper answer-reading position;

(8) Having indicator means viewable through the answer-uncoding portion of the template for indicating the proper position of the template for reading the question;

(9) Having means carried by the template on which the reader may record easily erasable answers to the questions found in the question frames.

Other objects and advantages will become apparent in the ensuing specification and appended drawing in which:

FIG. 1 is an exploded perspective view of the apparatus;
FIG. 2 is a plan view disposing the question-answer bearing portion of the apparatus in association with the template in a position for reading the question while the answer remains masked by coding; and
FIG. 3 discloses a fragmentary portion of the same illustrating the template shifted downwardly to a position where the answer is uncoded.

Referring now to the drawing in detail, my improved teaching apparatus comprises, in general, a book, binder or pad of question and answer-bearing pages indicated generally at A; a template B; and a magic slate device C carried by the lower portion of the template B, on which a reader may record his answers to the questions asked in the various frames of the book's pages.

Each page of question-answer book A is ruled with a vertical line 10 dividing it into a relatively wide question column 11 at one side thereof (e.g. the left side as illustrated) and a relatively narrow answer column 12 at the other side thereof. Each page is also ruled with vertically spaced horizontal lines 13 dividing the columns 11 and 12 into question frames in which are imprinted questions 14, and answer frames in which are imprinted answers 15. At the end of each question 14 is a blank space underlined by a line 18 (FIG. 2) in which the student will write the answer to the question before checking the coded answer 15.

Each answer 15 (FIG. 2) consists of a line or lines composed of a group of letters spelling an answer intermixed with a group of coding letters having no meaning and functioning to obscure the answer so as to render it unintelligible. Preferably, the letters spelling the answer are interposed in alternating succession with the coding letters, with one coding letter interposed between each pair of letters of the answer, whereby the latter may be sufficiently adjacent one another when read through the uncoding apertures of template B to render the answer easily recognizable. At one end of the row of answer letters and coding symbols 15, and spaced therefrom, is a registration mark 16 for informing the reader when the template is in the proper answer-reading position. Above the answer line 15 is a line of marks 17 (e.g. stars) adapted to register with the line of uncoding apertures of template B when the latter is in the question-reading and answer-masking position, and to appear immediately above the template B when it is in the answer-revealing position. The line of marks 17 may be used as an indicator device to notify the reader of the proper position of the template for reading both the question and the answer.

At the top of the question column 11 there may be provided a suitable title line 19 reading, for example, "THE CONSTITUTION OF THE UNITED STATES OF AMERICA." The questions in the several frames of the answer columns and the answers in the answer column 12, below such title may then relate thereto, for example as follows:

| | |
|---|---|
| The great men who wrote and ratified the Constitution set forth their reasons for creating a Constitution for the United States in the beginning paragraph of that important document. This introduction is called the PREAMBLE.<br><br>To explain their reasons for writing the Constitution of the United States, the Founding Fathers of this country wrote a_____ to the Constitution. | \*\*\*\*\*\*\*\*\*\*\*\*\*\*\*\*\*\*\*\*<br><br>epvrheyatmibollei  x |
| The introduction to the Constitution which explains why it was created is called the_____. | \*\*\*\*\*\*\*\*\*\*\*\*\*\*\*\*\*\*\*\*<br><br>tporyetalmibelge  x |
| The introduction to the Constitution starts,<br><br>"WE, THE PEOPLE OF THE UNITED STATES, IN<br><br>ORDER TO..."<br><br>These are the beginning words of the introduction to the Constitution that is called the_____. | \*\*\*\*\*\*\*\*\*\*\*\*\*\*\*\*\*\*\*\*<br><br>operleyagmqbhlke  x |
| Then, the Founding Fathers gave 6 reasons for establishing the Constitution of the United States.<br><br>The Preamble to the Constitution of the United States of America contains_____reasons for the creation of that Constitution. | \*\*\*\*\*\*\*\*\*\*\*\*\*\*\*\*\*\*\*\*<br><br>lsoilxi o p t f g   x |
| Our country is the United States. It is a union of individual States. The Constitution was designed to make this union of states as perfect as it could.<br><br>The United States is a _____of individual States. | \*\*\*\*\*\*\*\*\*\*\*\*\*\*\*\*\*\*\*\*<br><br>ouyniilotni k g h lx | left edge of the tab should be at the solid line separating the question frame from the Answer Box.

The template B comprises a stiff sheet 20 sufficiently heavy to remain substantially rigid in a flat plane, having a bottom rectangular area carrying the magic slate C, an upper leftward rectangular area 21 having a width corresponding approximately to the width of the vertical question column 11 of the question-answer book A; having a rightward marginal portion 22 of a width corresponding to that of the question column 12 of the book A; and having, as the top portion of the answer-covering area 22, answer-masking tab 23 which projects above the upper margin 24 of question bearing portion 21.

On the upper leftward portion 21 of the template body there is preferably provided a series of printed instruction paragraphs 25 which may read as follows:

(1) Move the wide top-edge (this one) of this template to the broken line at the bottom of the first frame on the page.

(2) Read the material in the frame and answer the question asked. Either remember your answer or write it on the magic slate below these instructions.

(3) Move this template down until the narrow top-edge (this one) of the Answer Tab in just below the star line in the Answer Box at the right of the page. The (4) Read the correct answer in the round holes of the Answer Tab. To be double sure you are lined up correctly, the last letter of the answer line (this will always be the letter "x") should appear in the *square* hole at the right of the tab.

(5) Now, move the template down until the wide top-edge is at the broken line at the bottom of the next frame and repeat all the steps.

From the instruction paragraph No. "3" above, an L-shaped lead line 26 is imprinted on the rightward answer-covering portion 22 of the template and terminates in an arrowhead 27 pointing to the answer-masking tab. A similar arrowhead 28 is preferably imprinted on the upper portion of the instruction area 21, pointing to the question-revealing upper margin 24 thereof, and directly associated with the first instruction paragraph designated "1" above, immediately above the words "(this one)," so as to directly relate that instruction to the upper margin 24.

In the answer tab 23, along the upper margin thereof, is a row of uncoding apertures 30 which may be circular or of equivalent regular form, and including at one extremity of the row an aperture 31 of different form (e.g. a square is shown) adapted to register with the indicator mark 16 and to thereby indicate the proper registration of the uncoding apertures 30 with the answer-spelling letters of answer line 15. Below the line of apertures 30 there may be provided a second line of apertures 32 which may register with the coding characters of answer line 15 so as to present an unintelligible row of characters when the question-framing margin 24 is properly associated with a question.

The operation of the apparatus is described in the instructions set forth above.

The magic slate device C comprises a transparent top sheet 35 of tough flexible plastic material upon which answers may be scribed with a stylus or a pencil point; an intermediate sheet 36 of translucent light-colored (e.g. light grey or milky white) material; and a bottom sheet 37 having a black surface to which the intermediate sheet 36 will adhere and which becomes visible through the sheet 36 when the latter is pressed downwardly into adhering contact therewith. Such devices are well known and the details thereof form no part of the present invention except in association with the template B.

I claim:

1. Teaching apparatus comprising: a question-answer sheet imprinted with adjacent vertical columns of questions and related answers respectively, said answers comprising respective rows of answer-spelling letters interposed with coding letters rendering said answers unintelligible; and a template having a body portion adapted to cover said question column and an integral lateral portion adapted to cover said answer column, said body portion having a horizontal upper margin adapted to be positioned beneath a selected question so as to reveal it above the template and to frame the question for study, and a tab projecting upwardly from said upper margin as an extension of said lateral portion and adapted to cover the answer of the question that is framed for reading, said tab having a row of uncoding apertures adapted to register with the answer of said framed question upon downward shifting of said template from the question-framing position, and thereby to reveal the letters spelling the answer while covering the coding letters, said row of uncoding apertures having therein a registration-indicator aperture, and each of said answers having an indicator character aligned with its row of answer-spelling letters and visible in said registration-indicator aperture when the template is in the proper position for reading the answer.

2. Teaching apparatus as defined in claim 1, wherein said registration indicator aperture has a configuration contrasting with that of the other apertures of said row of uncoding apertures.

3. Apparatus as defined in claim 1, wherein said lateral portion of the template has imprinted thereon an arrow pointing to said answer tab and wherein said body portion is imprinted with a statement of instruction associated with said arrow, for positioning of said answer tab.

4. Teaching apparatus comprising: a question-answer sheet imprinted with adjacent vertical columns of questions and related answers respectively in respective horizontally aligned frames in which each answer is in opposed relation to an end of a respective question, said answers comprising rows of answer-spelling letters interspersed with coding letters rendering said answers unintelligible; and a template having a body portion adapted to cover said question column, said body portion having a horizontal upper margin adapted to be positioned beneath a selected question so as to reveal it above the template and thereby frame the question for study, and a tab projecting upwardly from said upper margin as an extension of said lateral portion of said template, in a position to cover the answer for the question thus frame, said tab having a row of uncoding apertures positioned to register with the respective letters of said answer upon downward shifting of said template from the question-framing position while covering the coding letters, whereby to reveal the answer, said tab being further imprinted with a row of indicator marks positioned to be revealed above the upper margin of said tab when said answer-revealing apertures are in answer-revealing position, and said tab having a second row of apertures disposed below said row of answer-revealing apertures, adapted to register with the coding letters of the answer when the template is in the question-framing position, whereby to render the answer unintelligible.

5. Teaching apparatus as defined in claim 4, wherein said row of answer-revealing apertures are related to said second row of apertures so as to register with said indicator marks when said second row of apertures is in registration with said coding letters.

References Cited by the Examiner

UNITED STATES PATENTS

| 1,405,193 | 1/1922 | Favreau | 35—9 |
| 2,137,736 | 11/1938 | Watkins | 35—48.1 |
| 2,971,268 | 2/1961 | Zimmerman | 35—9 |
| 3,152,403 | 8/1964 | Betz | 35—9 |

EUGENE R. CAPOZIO, *Primary Examiner.*

R. E. KLEIN, *Assistant Examiner.*